(12) United States Patent
Moran et al.

(10) Patent No.: US 11,810,403 B2
(45) Date of Patent: *Nov. 7, 2023

(54) PARKING METHODS AND SYSTEMS

(71) Applicant: Municipal Parking Services, Inc., Minnetonka, MN (US)

(72) Inventors: Mark J. Moran, Woodbury, MN (US); Richard W. Kelley, II, Corcoran, MN (US); David E. Collins, Jr., Plymouth, MN (US); Marcus N. Schmidt, Minnetonka, MN (US); Christopher W. Baldwin, St. Paul, MN (US); Padmavathi Ramuni, Plymouth, MN (US)

(73) Assignee: Municipal Parking Services, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,098

(22) Filed: Nov. 7, 2022

(65) Prior Publication Data

US 2023/0056678 A1 Feb. 23, 2023

Related U.S. Application Data

(63) Continuation of application No. 16/712,687, filed on Dec. 12, 2019, now Pat. No. 11,495,059.

(Continued)

(51) Int. Cl.
*G07B 15/02* (2011.01)
*G06K 7/14* (2006.01)
*G06Q 20/12* (2012.01)
*H04W 4/20* (2018.01)
*G06V 20/10* (2022.01)

(Continued)

(52) U.S. Cl.
CPC .......... *G07B 15/02* (2013.01); *G06K 7/1417* (2013.01); *G06Q 20/127* (2013.01); *G06V 20/10* (2022.01); *G06V 20/586* (2022.01); *H04N 23/661* (2023.01); *H04W 4/20* (2013.01); *G06V 20/625* (2022.01)

(58) Field of Classification Search
CPC ....... G07B 15/02; G06V 20/586; G06V 20/10
USPC ........................................................... 705/13
See application file for complete search history.

(56) References Cited

U.S. PATENT DOCUMENTS 10,311,731 B1 * 6/2019 Li ........................... G08G 1/012
10,691,904 B1 * 6/2020 Randall .............. G06V 40/1365

(Continued)

*Primary Examiner* — Allyson N Trail
(74) *Attorney, Agent, or Firm* — Skaar Ulbrich Macari, P.A.

(57) ABSTRACT

Disclosed are devices, systems and methods for managing parking monitoring and enforcement. Parking at a meter or in a parking lot or ramp can be provided as a subscription. A registration and verification process for the subscription service can be provided as a multi-step process that combines the smart parking meter with a QR code, a mobile parking app for a smartphone, a central parking management system, and digital images of the parked vehicle(s). The registration process verifies that only vehicles owned by the subscriber are associated with the subscriber's account. Steps can also be employed to ensure that subscribers are not incorrectly issued parking citations by determining whether license plate data for a vehicle initially determined to be in violation matches an active subscription parker's roster of registered vehicles.

14 Claims, 8 Drawing Sheets

Related U.S. Application Data

(60) Provisional application No. 62/778,642, filed on Dec. 12, 2018.

(51) Int. Cl.
  *G06V 20/58* (2022.01)
  *H04N 23/661* (2023.01)
  *G06V 20/62* (2022.01)

(56) References Cited

U.S. PATENT DOCUMENTS

| | | | |
|---|---|---|---|
| 2014/0214500 A1* | 7/2014 | Hudson | G07B 15/02 705/13 |
| 2016/0171785 A1* | 6/2016 | Banatwala | G08G 1/0175 705/13 |
| 2017/0032582 A1* | 2/2017 | Moran | H04N 1/00326 |
| 2017/0032584 A1* | 2/2017 | Moran | H04W 4/029 |
| 2017/0109942 A1* | 4/2017 | Zivkovic | G07B 15/04 |
| 2017/0213262 A1* | 7/2017 | Kelley, II | G06Q 20/3224 |
| 2017/0249626 A1* | 8/2017 | Marlatt | G08G 1/042 |
| 2017/0278311 A1* | 9/2017 | Vespia | G06V 20/52 |
| 2017/0323227 A1* | 11/2017 | Sadeghi | G06Q 20/102 |
| 2019/0057372 A1* | 2/2019 | Batten | G06Q 20/386 |
| 2020/0035101 A1* | 1/2020 | Brooks | G08G 1/143 |
| 2020/0272950 A1* | 8/2020 | Xu | G06Q 30/0185 |
| 2021/0004729 A1* | 1/2021 | Sui | G06F 13/42 |
| 2021/0192227 A1* | 6/2021 | Lu | G06V 20/586 |
| 2022/0068134 A1* | 3/2022 | Chien | G08G 1/005 |

* cited by examiner

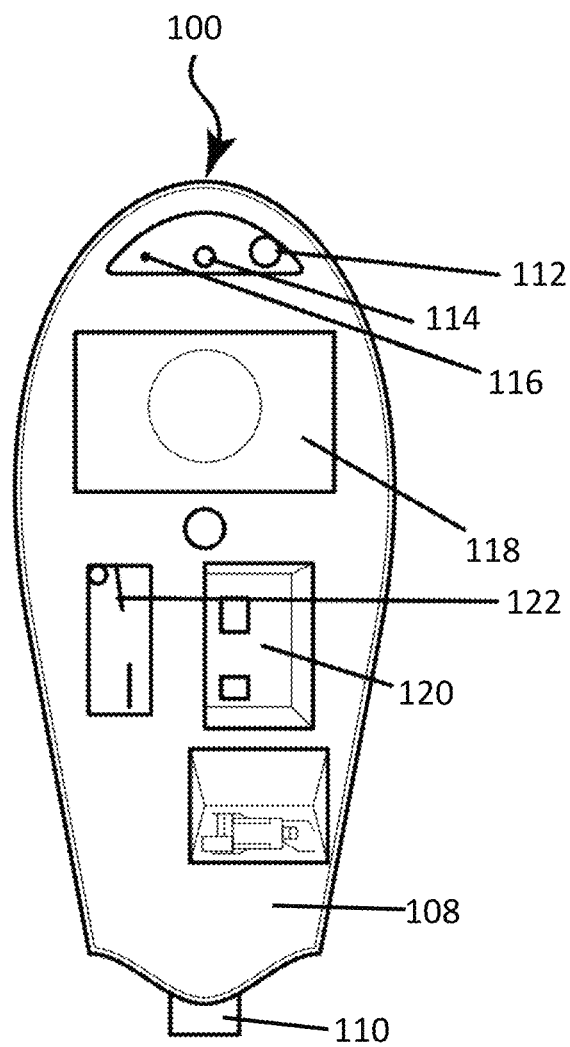
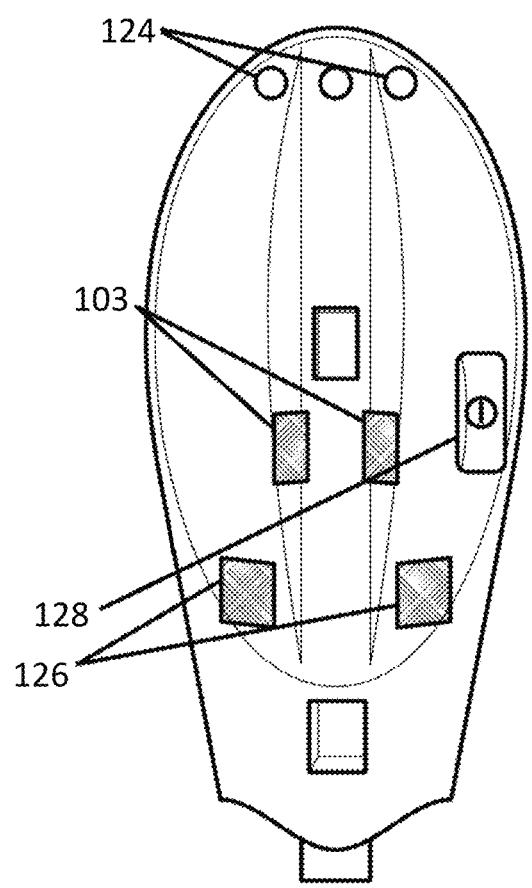
FIG. 1A
FIG. 1B

PARKING METHODS AND SYSTEMS

PRIORITY

This Application is a continuation of U.S. patent application Ser. No. 16/712,687, filed Dec. 12, 2019, which claims priority to and the benefit of U.S. Provisional Patent Application No. 62/778,642, filed Dec. 12, 2018, and both of which are incorporated fully herein by reference.

FIELD

The present invention relates generally to parking systems and, more particularly, to methods and systems of managing a parking subscription service.

BACKGROUND

Smart parking meter systems have been developed, such as those disclosed in U.S. Pat. Pub. Nos. 2014/0214499 A1 and 2014/0214500 A1 (which are both incorporated herein by reference in their entirety), which can monitor a given parking space for violations and automatically issue a citation electronically if a violation occurs.

In order to purchase parking time via a smart parking meter system, the user must interact with the parking meter or its networked systems for each parking event. This can be accomplished by using the parking meter's own user interface, or a parking app on a smartphone can be used such as provided in U.S. Pat. Pub. No. 2017/0032584 A1, which is incorporated herein by reference in its entirety.

However, there is an ongoing need to reduce or eliminate the need to interact with the parking meter and address any ancillary problems that such reduction or elimination creates.

SUMMARY

The present invention provides unique devices, systems and methods for managing parking monitoring. Parking at a meter or in a parking lot or ramp can be provided as a subscription. A registration and verification process for the subscription service can be provided as a multi-step process that combines the smart parking meter with a QR code, a mobile parking app for a smartphone, a central parking management system, and digital images of the parked vehicle(s). The registration process verifies that only vehicles owned by the subscriber are associated with the subscriber's account.

A method can be employed to ensure that subscribers are not incorrectly issued parking citations by determining whether license plate data for a vehicle initially determined to be in violation matches an active subscription parker's roster of registered vehicles.

The disclosure includes a smart parking system. The system can include a parking meter, camera and central control computer. The parking meter includes a housing and a microcontroller disposed inside of the housing. The camera is in communication with the microcontroller and is aimed towards a parking space that is monitored by the parking meter. The central control computer can be networked with the parking meter. The microcontroller of the parking meter is configured to generate a QR code in response to an input from a user and transmit a first QR code data for the QR code to the central control computer. The central control computer is configured to perform a vehicle registration verification. The verification includes receiving a second QR code data from a smartphone app executing on a smartphone of the user that is networked with the central control computer. A license plate data is received from the smartphone app of the user for a vehicle that the user wishes to register for a subscription parking service. A license plate recognition is performed on an image of a license plate of a vehicle located in the parking space that is monitored by the parking meter. The first QR code data is compared to the second QR code data to determine whether there is a QR code match. The license plate data is compared to a result of the license plate recognition to determine whether the vehicle located in the parking space that is monitored by the parking meter matches the license plate data for the vehicle that the user wishes to register for the subscription parking service.

The central control computer can be configured to register the vehicle that the user wishes to register for a subscription parking service only if a result of the QR code match is affirmative and if the license plate data from the license plate recognition matches the license plate data for the vehicle that the user wishes to register for the subscription parking service.

The camera can be disposed inside of the housing of the parking meter or located external to the housing. The parking meter can include an infrared illuminator provided to the housing and arranged to illuminate the parking space that is monitored by the parking meter. The parking meter is configured as a bollard or as a kiosk or as a parking meter. The parking meter can include a graphical user interface provided to the housing that is coupled to the microcontroller.

A vehicle sensor can be embedded in a roadway beneath the parking space that is monitored by the parking meter. The vehicle sensor is networked with the microcontroller of the parking meter. The vehicle sensor can be integrated into the housing of the parking meter. Multiple different types of vehicle sensors can be employed to increase the confidence that a correct determination of vehicle presence is made. The camera can be the vehicle sensor or can be one of the vehicle sensors. Additional sensor types are described herein below.

The disclosure also includes a method of registering a vehicle for a parking subscription service. The method includes inputting by a user a license plate data for a vehicle to be registered for the parking subscription service into a smartphone app that is executing on a smartphone networked with a parking management computer system. A parking meter generates a QR code. The parking meter transmits data for that QR code to the parking management computer system. The QR code is also scanned with the smartphone of the user and data for the scanned QR code is transmitted to the parking management computer system. A camera coupled to the parking meter captures an image of a license plate of a vehicle located in a parking space that is monitored by the parking meter. The image of the license plate is then transmitted to the parking management computer system. A license plate recognition procedure is performed on the image of the license plate of the vehicle located in the parking space that is monitored by the parking meter. The parking management computer system determines whether the data for the QR code scanned with the smartphone of the user matches the data for the QR code transmitted by the parking meter. A result of the license plate recognition procedure is evaluated to determine whether it matches the license plate data inputted by the user. The vehicle is registered for the subscription parking service only if both the data for the QR code scanned with the smartphone of the user matches the data for the QR code and the result of the license plate recognition procedure matches the license plate data inputted by the user.

A human customer service representative can review the image of the license plate of the vehicle located in the parking space that is monitored by the parking meter if the license plate recognition procedure fails to generate the result. The human can then manually input to the parking management computer system a license plate data for the license plate shown in the image. The manually entered license plate data is used by the parking management computer system to perform the step of determining whether the result of the license plate recognition procedure matches the license plate data inputted by the user.

The disclosure also includes a method of protecting subscribers of a parking subscription service from a ticket issued by a parking enforcement officer (PEO). A smart parking meter might generate a violation notification for a vehicle registered in a parking subscription service due to a smart parking system being unable to perform a license plate recognition on an image of a license plate of the vehicle created by a camera coupled to a parking meter monitoring a parking space where the vehicle is parked. The method includes manually inputting to a parking management computer system a license plate data for the license plate shown in the image. The parking management computer system determines that the license plate data matches an active subscription parker's roster of registered vehicles. Funds are directed from the subscription parker's account to the parking meter so the parking meter shows paid time. A violation indication at the parking meter is cleared.

The PEO can be informed via a violations generating app on their computing device, which is networked with the parking management computer system, that a violation notice cannot be issued because the vehicle belongs to the active subscription parker's roster of registered vehicles.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIGS. 1A and 1B are front and back views, respectively, of a smart parking meter according to certain example embodiments.

Figure 2:
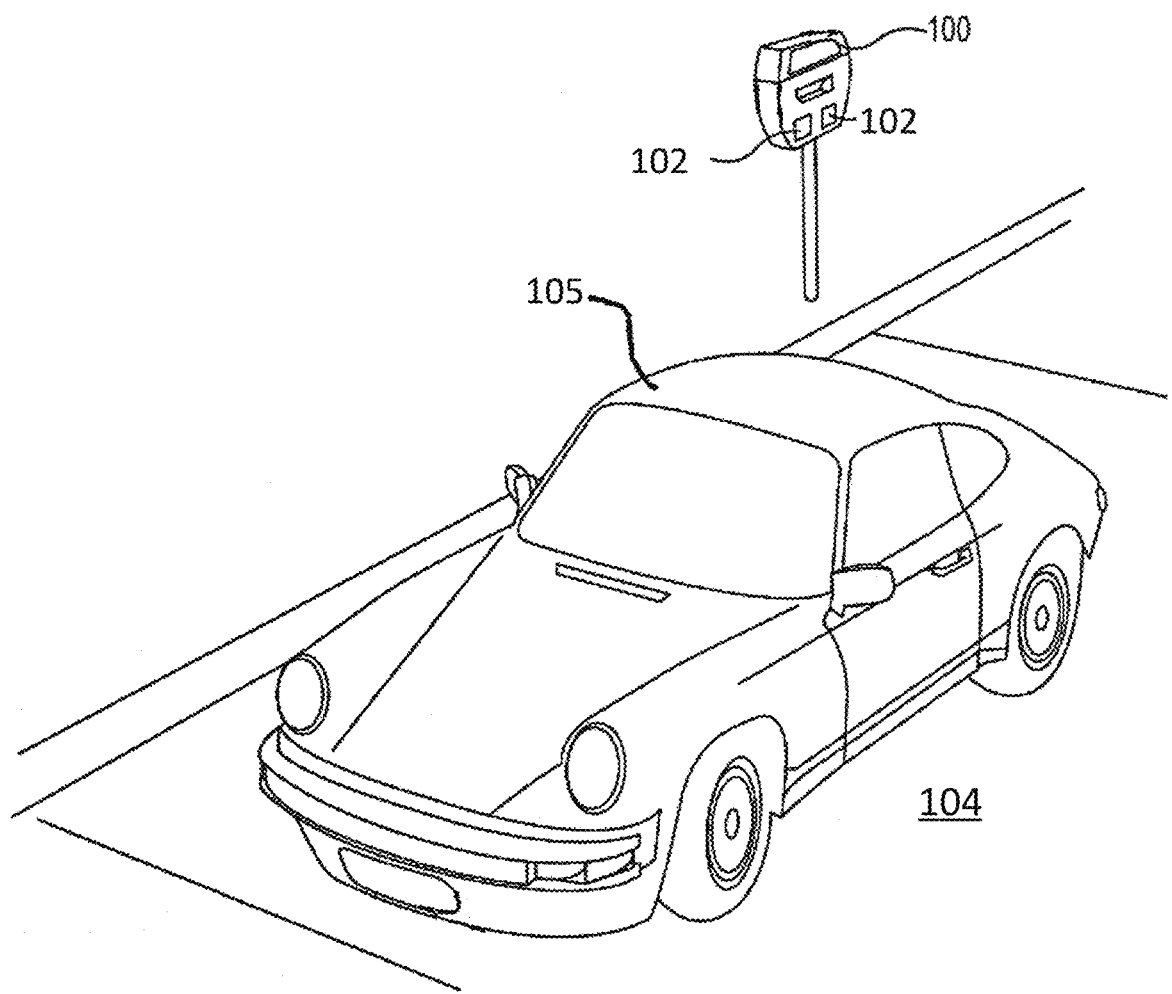
FIG. 2 is a diagram of a vehicle in a parking space being monitored by a smart parking meter according to certain example embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIGS. 1A, 1B, 2 and 3, smart parking meters 100, such as those disclosed in U.S. Pat. Pub. Nos. 2014/0214499 A1 and 2014/0214500 A1 (which are both incorporated herein by reference in their entirety herein), can be deployed adjacent to various parking spaces. Such smart parking meters 100 can include one or more cameras 102 disposed inside of the meter's housing and aimed or arranged to monitor parking spaces 104 adjacent to the meter. The cameras 102 can be configured to capture video or still images. The cameras 102 can also be located adjacent the parking meters and be communicatively coupled to the parking meters. One parking meter 100 can also be coupled to a plurality of external cameras so that a single meter monitors several parking spaces.

Referring to FIGS. 1A and 1B, each parking meter 100 includes an enclosure 108 mounted atop a pole 110. The housing 108 encloses and protects the electronics components mentioned above. In addition, the housing includes, on the front side, a speaker 112, front-facing camera 114 and microphone 116 disposed adjacent to the graphical user interface (e.g. touch screen) 118. A payment acceptance means 120 and coin slot 122 are also provided. The payment acceptance means 120 can be a contactless or conventional card reader, or other known means for accepting payment.

The rear side of the housing 108 includes a plurality of violation indicator lights 124, windows 103 through which the cameras 102 can see, infrared (IR) illuminators 126 to provide supplemental IR light to aid the cameras' sight, and a lock mechanism 128 to keep unwanted persons from opening the housing 108.

Figure 3:
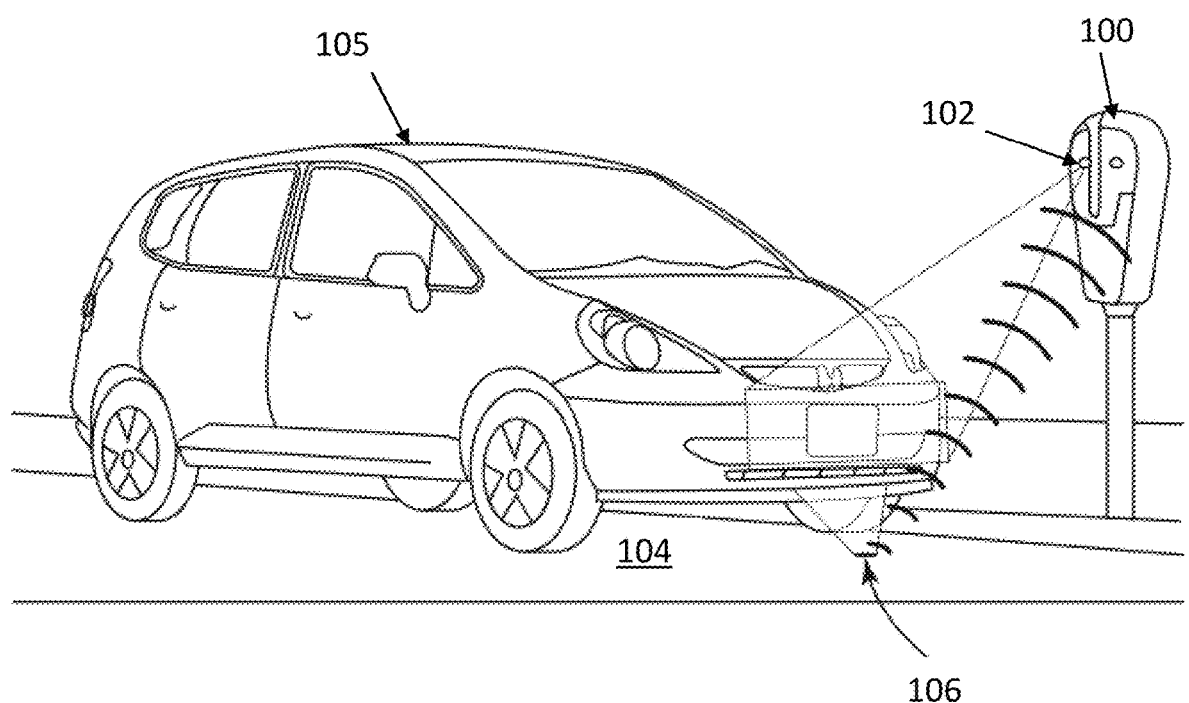
FIG. 3 is another diagram of a vehicle in a parking space being monitored by a smart parking meter according to certain example embodiments.

Referring now to FIGS. 2-3, the smart parking meter 100 includes a camera 102 to view a portion of a vehicle when the vehicle 105 is located in the parking space 104 being monitored. In FIG. 2, the rear side of the vehicle 105 is being viewed by the camera 102. In FIG. 3, the front side of the vehicle 105 is monitored by the camera 102.

In addition, a vehicle sensor 106 is embedded in the road underneath the vehicle 105 when the vehicle is present in the parking space 104. The sensor can be disc-shaped to facilitate embedding in the roadway. The vehicle sensor 106 can also be located in alternative positions such as in the curbing, on a pole adjacent to the parking space (including the same pole as the parking meter 100). The vehicle sensor can also be integrated into the parking meter 100 housing or disposed external to the housing. One or both of the cameras 102 can be used as a vehicle sensor 102.

The vehicle sensor 106 can use one or more means for sensing a nearby object. For example, the vehicle sensor can be a magnetic sensor or it can utilize radar, video, static images, sonar, laser, infrared, etc.

The vehicle sensor 106 broadcasts a status message to the nearby meter 100 as shown in FIG. 3. The broadcast can be performed using low power Bluetooth or other short range wireless communications protocol. The broadcast frequency can be continuous or periodic. For example, the status of the vehicle sensor 106 can be broadcast once per second, ten times per second, etc.

In one preferred embodiment, the vehicle sensor 106 is powered by an internal lithium-based battery and a sensing/broadcast cycle is performed once per second in order to conserve battery life. A sensor life expectancy of several years can be achieved using such battery and operating method. In other embodiments, the sensor can be hard-wired for power and/or broadcast.

In embodiments where the vehicle sensor 106 is integrated into, or located adjacent to, the parking meter 100, the sensor can be coupled to the meter 100 via the internal wires (if internal) or via an electrical conduit (if external). The conduit can carry both power and data bi-directionally, or separate power and data conduits can be provided.

Figure 4:
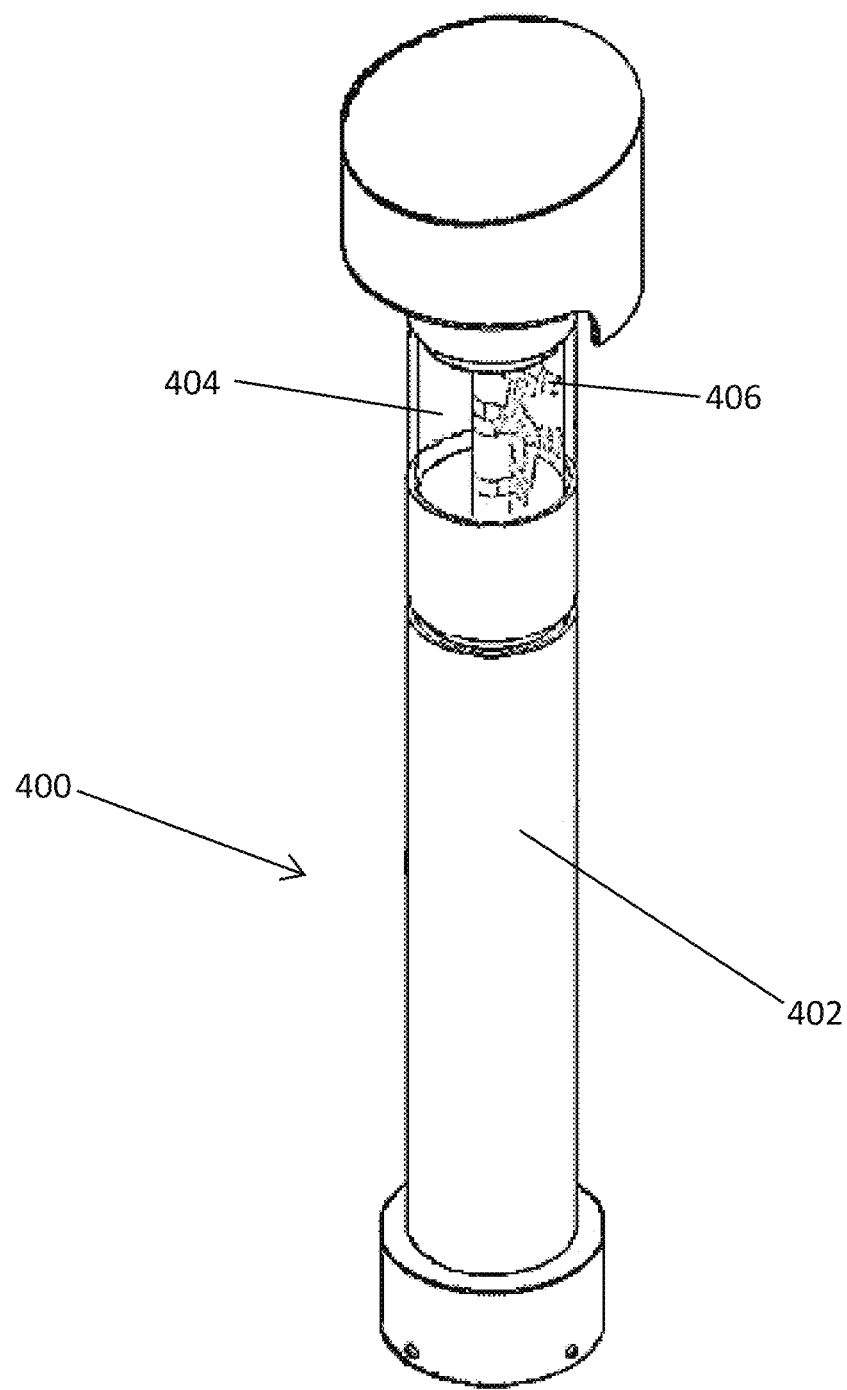
FIG. 4 is a perspective view of a parking bollard according to certain example embodiments.

Referring to FIG. 4, the present invention can be embodied, for example, in the form of a parking bollard 400. The bollard 400 can be used as a stand-alone device for subscription parkers, or the bollard 400 can be networked with a full-featured smart parking meter or kiosk.

The bollard generally comprises an outer enclosure 402 with the electrical and sensing components, such as the processor, memory and sensor are disposed inside of the enclosure. A portion of the enclosure can be transparent (or semi-transparent) which defines a window 404 so that the camera used for the machine vision techniques can see through to the area being monitored. The outline of the cameras 406 can be seen through the window 404. One or more of the sensors can also be located remote from the enclosure 402 in a further alternative embodiment.

Figure 7:
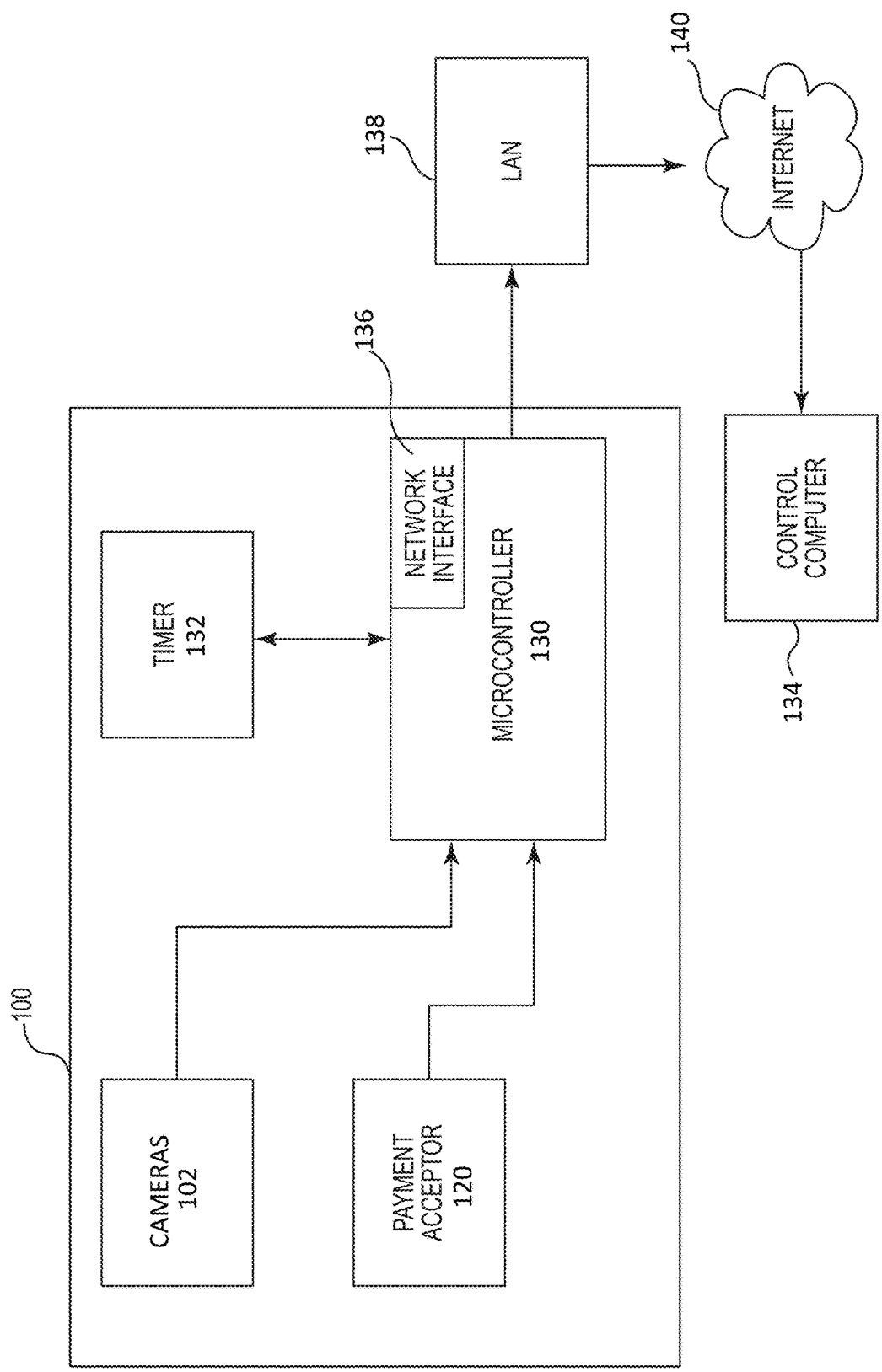
FIG. 7 is a block diagram of components of a parking meter system according to certain example embodiments.

Referring to FIG. 7, certain internal components of the parking meter 100 will now be discussed. A microcontroller 130, or microprocessor, with associated physical memory is disposed inside of the housing 108 of the meter 100. The software code controlling the operation and function of the meter is stored in the memory. The memory may include one or more non-volatile storage devices and/or one or more volatile storage devices (e.g., random access memory (RAM)).

Computer readable program code is stored in the memory, such as, but not limited to magnetic media (e.g., a hard disk), optical media (e.g., a OVO), memory devices (e.g., random access memory, flash memory), etc. The computer readable program code is configured such that when executed by the microcontroller 130, the program code causes the parking meter 100 to perform the functions described herein. In other embodiments, the parking meter is configured to perform steps described below without the need for code.

Referring additionally to FIG. 3, the parking meter 100 functions to monitor parking events, including determining the presence of a vehicle 105 in a parking space 104, determining the identity of the vehicle, permitting the parking user to pay for parking time, determining parking violation notices, and other intelligent functions.

A timer 132 is coupled with and controlled by the microcontroller 130. The microcontroller 130 can also count processor clock cycles as a form of timer. The camera(s) 102 is/are coupled with and in two-way communication with the microcontroller 130. The payment acceptance mechanism 120 is also coupled with and sends signals to microcontroller 130. Additional components such as the GUI 118 and any other lights, cameras, illuminators, sensors, etc. are also coupled in operable communication with the microcontroller 130.

The payment acceptance mechanism 122 can be configured to accept payment by any one or more conventional means, including coin, paper bill, token, coupon, credit/debit card, smart phone or a combination thereof. The payment acceptor 122 can also be configured to accept contactless payments. In one embodiment of accepting contactless payments, a near field communications (NFC) component is disposed in the meter to accept mobile payments using, for example, services such as Google Wallet, PayPal, EZ Pass and Pay Pass. Virtual currencies such as Bitcoin and the like can also be accepted. A QRS code image can also be displayed on the meter's screen for the user to scan with their phone to submit payment with an appropriate application on their phone enabling such payment method. A scanner can also be provided to the parking meter 100 so that the parking meter can read QRS codes or other images presented to it by the user.

In alternative embodiments, various types of sensors can be used to detect the presence and absence of a vehicle in an associated parking spot other than by use of the camera. For example, an ultrasonic sensor, a light sensor, a pressure sensor (in the pavement), a magnetic field sensor, image sensor, sonar and radar sensors can all be used as alternatives. Each can be incorporated in the meter housing, on a separate mount, or embedded in the road or curb. Any of these alternatives are operatively connected to the microprocessor 130, which can determine the presence/absence of a vehicle based upon state change information returned from the particular sensor employed. The remainder of the operation and components are as otherwise described herein.

Each of the parking meters 100 can also be networked with a central or control computer 134 for added control and functionality. The meter 100 further includes a network interface 136 either integrated into the microcontroller 130, or as a separate component. The network interface 136 is configured to enable communication with a communication network (e.g. a local area network (LAN 138), the Internet or World Wide Web), using a wired and/or wireless connection. Network communication means include, but are not limited to, Wi-Fi, Bluetooth, cellular (HSPA, LTE, GSM, CDMA), DSL, cable, etc. The LAN 138 may include other meters 100 all in communication with a master or main meter for a plurality of dependent meters. In LAN configuration, the LAN 138 can be connected to the Internet 140 as illustrated in FIGS. 7-8.

The parking system can include a host or control computer 134 that governs the operation of and/or stores the data from a given number of networked parking meters 100. The central or control computer 134 may comprise one or more servers interfacing with networked storage in a data center. The control computer 134 is located remotely in a secure location for convenience and security purposes. The LAN 138, in turn, is connected to the World Wide Web (i.e. internet) in order to be in communication with a variety of other computing systems, including law enforcement and operations companies. This way, the data can be securely stored and reviewed by appropriate authorities and the operations of all meters in a given system can be monitored and remotely controlled via a central operator.

Figure 8:
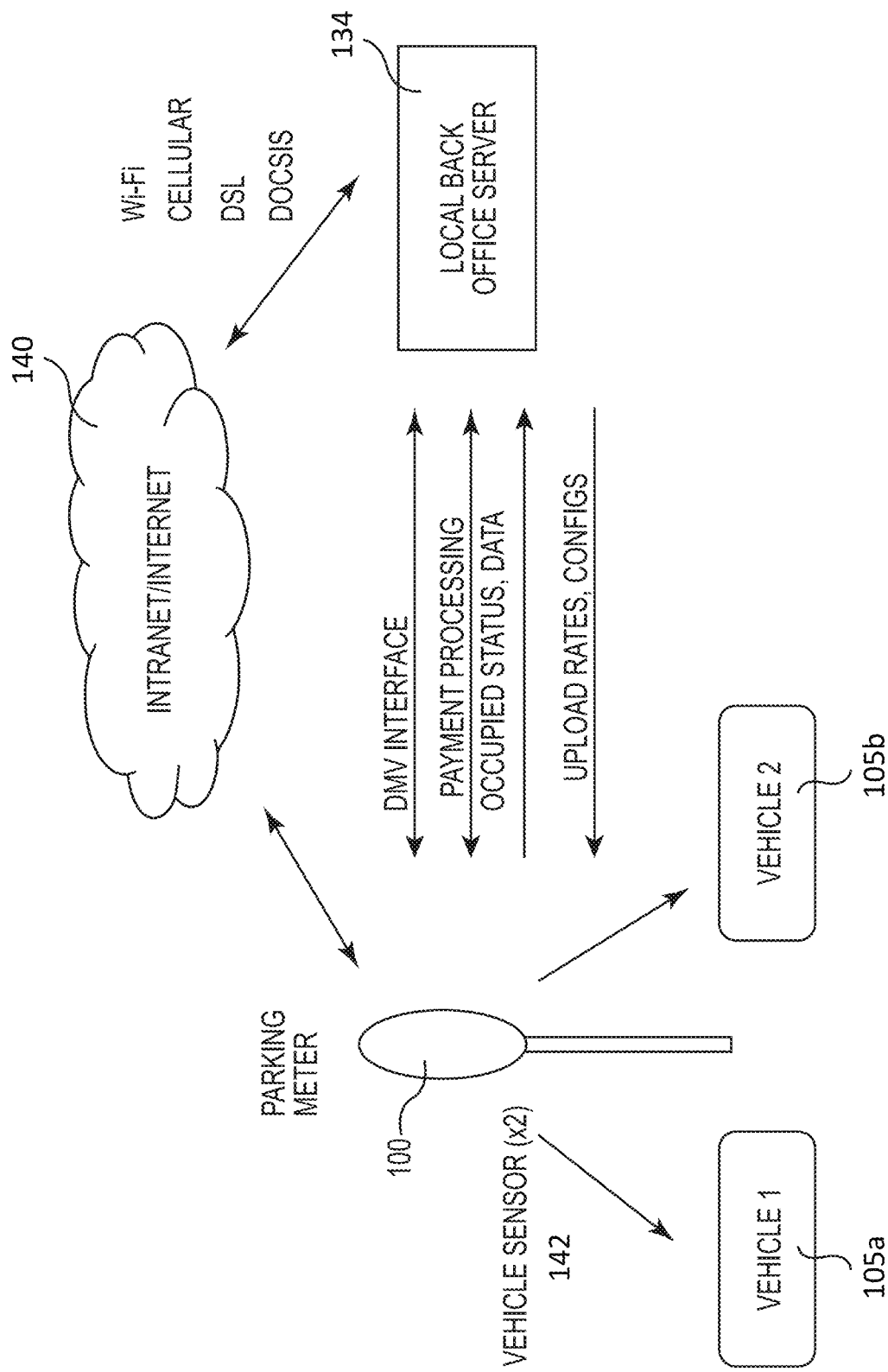
FIG. 8 is a block diagram of components of a parking meter system according to certain example embodiments.

FIG. 8 provides a communication diagram of certain components of a parking system according to certain embodiments. The parking meter 100 includes two vehicle sensors 142, each associated with a specific parking spot. More than one vehicle detection sensor can be provided per parking spot as well, as is disclosed in United States Patent Pub. No. US2018/0240337 A1, which is hereby incorporated herein by reference in its entirety.

The parking meter 100 periodically queries the vehicle sensors 142 to determine whether a first vehicle 105a or a second vehicle 105b is present in the corresponding parking space 104. The parking meter 100 is also in communication via the LAN 138, Internet 140, Intranet, etc. with the back office server or computer 134. Data exchanged with the back office server 134 includes occupied/unoccupied status of the monitored spaces 104, the parking meter's unique identification data, payment processing information, license plate recognition (LPR) data, video and image data, maintenance data, operational status, and other data as desired by the operator and the department of motor vehicles in the municipality where the parking meter is located. The back office server 134 can also supply the parking meter 100 with configuration data, including parking rates, and display messages on the parking meter's GUI 118.

The parking meter 100 uses its camera to read the license plate or to read another vehicle identification means employed by the licensing authority where the meter is located. For example, if the license plate provides alphanumeric data, then the meter is equipped to read the alphanumerals. This can be accomplished with equipping the parking meter with so-called license plate reading (LPR) software that reads or converts the image of the license plate taken by the camera(s) to alphanumeric text. If the plate (or other part of the vehicle) is equipped with a radiofrequency ID tag (RFID), then the meter is equipped with an RFID tag reader. And if the plate (or other portion of the vehicle) is equipped with a machine readable barcode or transmitter/receiver (e.g. a matrix barcode) then the parking meter is equipped with a transmitter receiver (to read plate, yin, driver info) or with a bar code reading device. The reading means in each instance is in operable communication with the microcontroller 130 (or is performed by the microcontroller 130). Multiple reading means can be included in a single or multi-space meter system to allow the system to adapt to a variety of licensing methodologies.

The LPR function can also be performed by a remotely-located computer system, such as the control computer 134, that performs the recognition on an image data provided by the parking meter 100.

Further, one smart meter 100 can be networked with one or more remotely-located cameras disposed adjacent to additional parking spaces so that one parking meter 100 can monitor several different parking spaces and parking events.

The smart parking meter 100 can also be configured as a kiosk and placed adjacent to a parking lot or ramp to monitor entry and exit events at a lot or ramp as explained in U.S. Pat. Pub. No. 2014/0214500 A1. A kiosk can also simultaneously function as a parking space meter. A single kiosk or meter can further be coupled to one or more remote cameras that each monitor individual parking spaces so that the single kiosk or meter monitors multiple individual parking spaces or events throughout a lot, ramp or street segment.

Note that when the terms meter and parking meter are used throughout this application, such use should be understood to include both smart parking meters and kiosks.

In order to reduce or eliminate the need for a parker or parking user to interact with a parking meter 100 (either directly at the meter or indirectly via a parking app executing on a smartphone or personal computing device) for each parking event, a parking subscription service can be provided. The user establishes an account with the parking authority and each time a parker parks a registered vehicle at one of the smart parking meters 100 administered by that parking authority, the parker's account will be automatically debited the corresponding parking fee without the need to interact with the meter at all.

The parking meter is able to automatically recognize a given vehicle that parks in a monitored parking space or enters a parking lot as explained herein above. Since the license plate (or other identification means) is registered with the parker's subscription account, the vehicle can be automatically matched to the parker's account when entering the parking space. Thus, the parker need not interact with the parking meter because the meter automatically recognizes the vehicle and debits the parker's account accordingly.

The parker's subscription account can be charged a flat monthly fee for all parking events. The account can also be established with a positive credit balance and the parking fees automatically debited on a per-parking event basis. The account can also be linked to a credit card for incurring charges for each parking event. Any combination of a monthly subscriber fee, account credit balance and credit card association can also be employed.

One of the concerns that arises with a subscription service is that someone might register a vehicle that is not theirs in order to monitor or stalk the parking activity of another person. For example, a parking activity report could be generated by the parking subscription service and anyone who registers a vehicle's license plate with their account would have access to that vehicle's parking activity data.

In order to protect against the unauthorized subscribing of a vehicle, a verification method can be added to the registration process. If a person attempts to add a vehicle license plate (or other ID) that is not theirs to the subscription program, they will not be able to complete registration with that vehicle license plate (vehicle ID) and, consequently, they will not receive notifications of subscription parking activity related to that vehicle license plate (vehicle ID).

Figure 5:
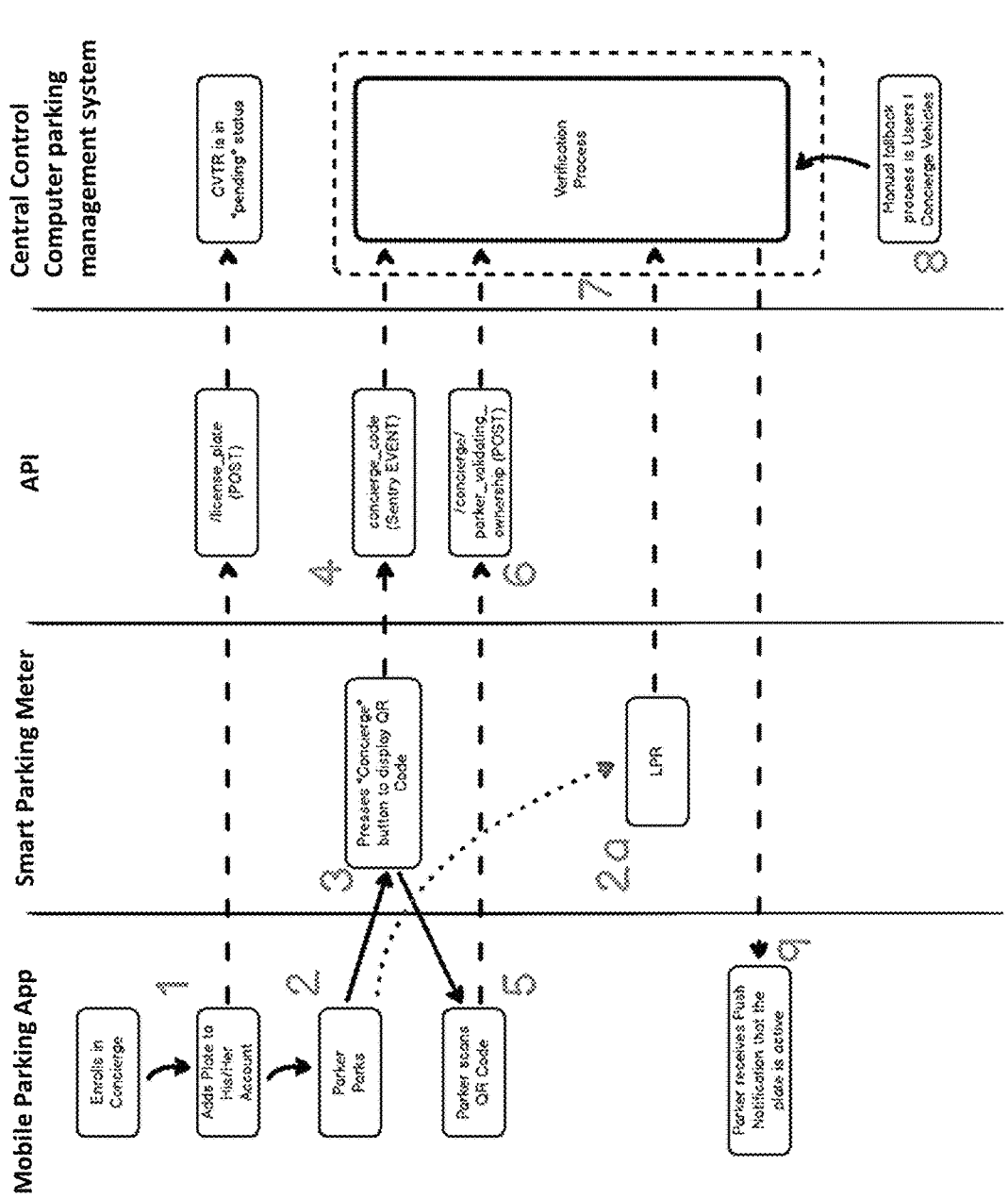
FIG. 5 is a diagram of a new license plate registration method for a parking subscription service according to certain example embodiments.

Referring to FIG. 5, and as explained below, the registration and verification process for the parking subscription service is a multi-step process that combines the smart parking meter 100 with a QR code, the mobile parking app for a smartphone, the parking management system 134, and digital images of the parked vehicle(s).

Vehicle Registration Process

1. The parker (user) establishes a parking account with the parking authority. The parker will then be able to use a mobile parking app on their smartphone (or other mobile computing device) to interact with the parking meters to pay for parking events without needing to physically interact with a given parking meter. A suitable parking app for a smartphone is disclosed in U.S. Pat. Pub. No. 2017/0032584 A1, which is incorporated herein by reference in its entirety.

2. The parker uses their mobile parking application on their mobile computing device to enroll in the subscription program. They will be prompted to enter a new license plate number and corresponding state.

3. The parker must then park at one of the smart parking meters 100 of the parking authority which triggers a normal parking session. Normally the parking meter 100 sends the license plate pictures to the LPR (License Plate Recognition) engine and stores them in the central parking system's parking management system 134.

4. The parker is provided with a small window or amount of time in which to press the "Concierge" button on the smart parking meter 100. Pressing this button generates a one-time QR code that embeds a random sequence of characters unique to this specific parking session.

5. When the parker presses the "Concierge" button on the parking meter to display the QR code, the parking meter sends the unique code, and information outlining this specific parking session, to central parking system's parking management system 134 via the internet 140 via an API (application program interface) for the parking management system 134.

6. The parker scans the QR code with their smartphone using the mobile parking application and the mobile parking application forwards the scanned QR code to the parking management system 134.

7. The parking authority's central computer 134 then performs a three-way match to complete the verification. Each of the following must match: (1) the code generated by the parking meter 100, (2) the QR code scanned by the parker with their mobile app, and (3) the parking session must contain a picture containing LPR data with an exact match of the particular parker's license plate being registered.

As a fallback mechanism, a customer service representative from the parking authority can manually enter the parker's license plate information if there is a picture that a human can accurately read, but the LPR system could not read.

8. Finally, if the three-way match is complete, the license plate being registered is set to "active" for this parker and the parker can now park using the parking subscription service.

Protecting Subscribers from a Ticket Issued by the Parking Authority Enforcement Officer Smart parking meters 100 and the parking management system 134 can be utilized by the municipality in conjunction with live parking enforcement officers (PEOs). An example of this is provided in U.S. Application Pub. No. US 2017/0032582 A1, which is hereby incorporated herein in its entirety. In such situations, there will be PEOs that walk the streets as directed by the parking management system to cite vehicles that are in violation status.

Figure 6:
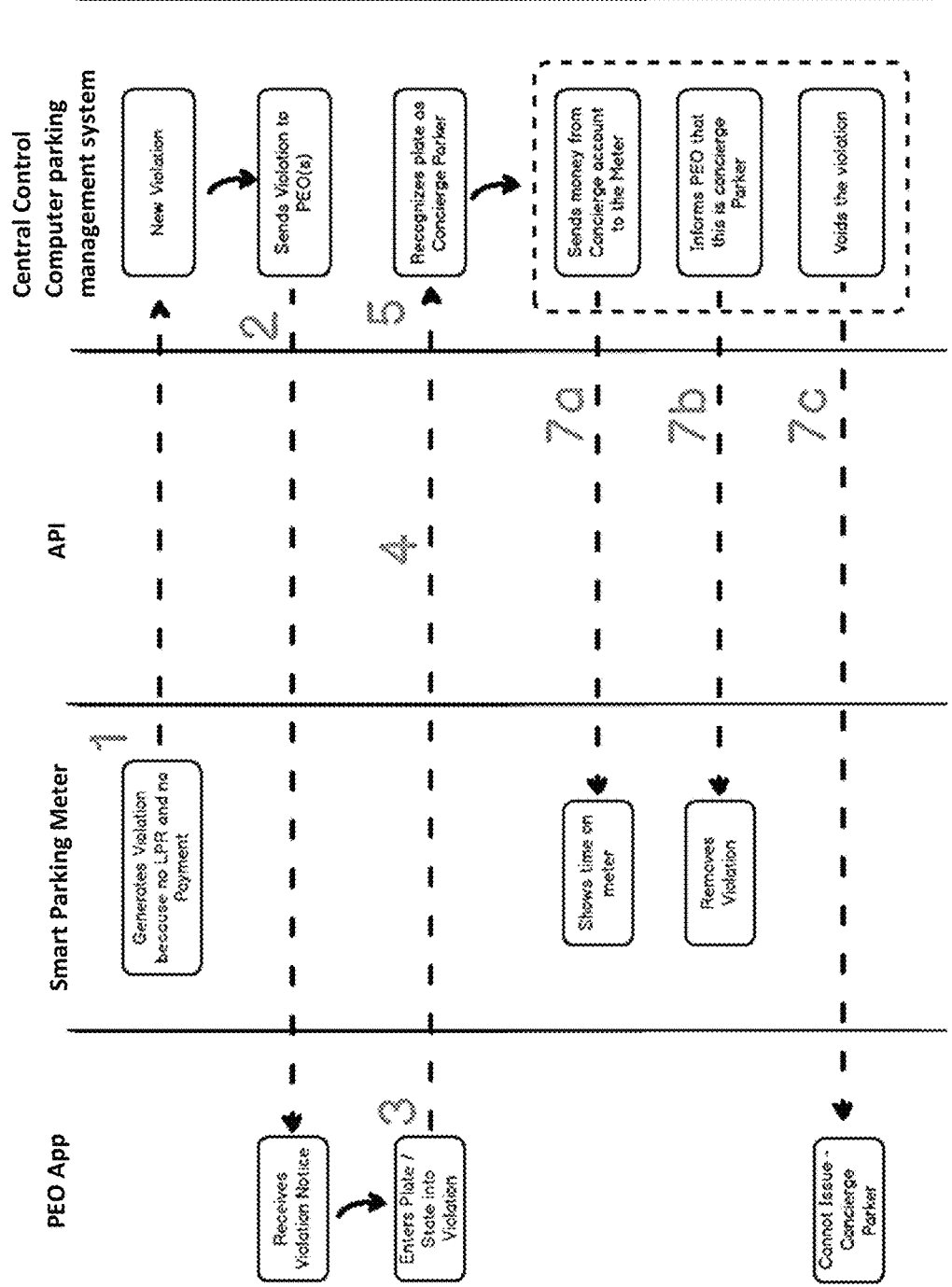
FIG. 6 is a diagram of a method of protecting subscription parkers from parking enforcement officer issued tickets according to certain example embodiments.

In the rare case that a particular smart parking meter 100 did not obtain an accurate license plate reading, it is possible for the PEO to use the PEO App to manually create a ticket (violation notice). In this case, and referring to FIG. 6, parking service subscribers can still be protected against receipt of tickets by employing the following steps:

1. A smart parking meter 100 generates a violation notification because a subscription parker parked and did not pay, but the parking authority received no LPR (and thus did not recognize that this was a subscription parker).

2. This violation notification causes the parking management system to inform PEOs near the parking meter of the violation.

3. In order to issue the ticket, the PEO must manually enter the vehicle's plate (vehicle ID) and plate-state when creating the violation ticket in the PEO app.

4. The PEO app sends this manually-entered information to the parking management system 134 where the information is checked to see if the suspected violating vehicle's ID matches an active subscription parker's roster of registered vehicles.

6. If the vehicle ID does not match an active subscription parker's roster of registered vehicles, the violation issuance continues as normal.

7. If the vehicle ID does match an active subscription parker's roster of registered vehicles, a number of steps automatically occur:
  a. The parking management system 134 directs funds from the subscription parker's account to the parking meter so the parking meter shows paid time.
  b. The parking management system 134 voids the violation notice in the parking management system, and clears the violation indication at the parking meter.
  c. The parking management system informs the PEO app that this violation cannot be issued because the vehicle ID matches an active subscription parker's roster of registered vehicles.

In the case where there is no ability to read (e.g., no LPR), or an unsuccessful read of, the license plate of the vehicle, a human (e.g., a customer service representative) can review the images of the parking event and manually enter the license plate data and transfer funds to the parking meter from the user's subscription account. Thus, the PEO would not receive a notice of a violation because the vehicle is now recognized and the parking fee paid.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A smart parking system, comprising:
  a parking meter, including a housing and a microcontroller disposed inside of the housing;
  a camera in communication with the microcontroller, wherein the camera is aimed towards a parking space that is monitored by the parking meter; and
  a central control computer networked with the parking meter,
  wherein the microcontroller of the parking meter is configured to generate a first machine-readable code in response to an input from a user and transmit a first machine-readable code data for the first machine-readable code to the central control computer,
  wherein the central control computer is configured to perform a vehicle registration verification, comprising:
    receiving a second machine-readable code data from a smartphone app executing on a smartphone of the user that is networked with the central control computer;
    receiving a license plate data from the smartphone app of the user for a vehicle that the user wishes to register for a subscription parking service;
    performing a license plate recognition on an image of a license plate of a vehicle located in the parking space that is monitored by the parking meter;

comparing the first machine-readable code data to the second machine-readable code data to determine whether there is a machine readable code match;

comparing the license plate data to a result of the license plate recognition to determine whether the vehicle located in the parking space that is monitored by the parking meter matches the license plate data for the vehicle that the user wishes to register for the subscription parking service.

2. The smart parking system of claim 1, wherein the central control computer is configured to register the vehicle that the user wishes to register for a subscription parking service only if a result of the machine-readable code match is affirmative and if the license plate data from the license plate recognition matches the license plate data for the vehicle that the user wishes to register for the subscription parking service.

3. The smart parking system of claim 1, wherein the camera is disposed inside of the housing of the parking meter.

4. The smart parking system of claim 1, wherein the parking meter includes an infrared illuminator provided to the housing and arranged to illuminate the parking space that is monitored by the parking meter.

5. The smart parking system of claim 1, wherein the parking meter is configured as a bollard.

6. The smart parking system of claim 1, wherein the parking meter includes a graphical user interface provided to the housing that is coupled to the microcontroller.

7. The smart parking system of claim 1, further comprising a vehicle sensor embedded in a roadway beneath the parking space that is monitored by the parking meter, wherein the vehicle sensor is networked with the microcontroller of the parking meter.

8. The smart parking system of claim 1, further comprising a vehicle sensor integrated into the housing of the parking meter.

9. The smart parking system of claim 8, wherein the vehicle sensor is the camera.

10. A method of registering a vehicle for a parking subscription service, the method comprising:

inputting by a user a license plate data for a vehicle to be registered for the parking subscription service into a smartphone app that is executing on a smartphone networked with a parking management computer system;

generating by a parking meter a machine-readable code;

transmitting by the parking meter a data for the machine-readable code to the parking management computer system;

scanning the machine-readable code with the smartphone of the user;

transmitting data for the scanned machine-readable code to the parking management computer system;

capturing with a camera coupled to the parking meter an image of a license plate of a vehicle located in a parking space that is monitored by the parking meter;

transmitting the image of the license plate to the parking management computer system;

performing a license plate recognition procedure on the image of the license plate of the vehicle located in the parking space that is monitored by the parking meter;

determining by the parking management computer system whether the data for the machine-readable code scanned with the smartphone of the user matches the data for the machine-readable code transmitted by the parking meter;

determining whether a result of the license plate recognition procedure matches the license plate data inputted by the user; and registering the vehicle for the subscription parking service only if both the data for the machine-readable code scanned with the smartphone of the user matches the data for the machine-readable code and the result of the license plate recognition procedure matches the license plate data inputted by the user.

11. The method of claim 10, further comprising:

reviewing by a human customer service representative the image of the license plate of the vehicle located in the parking space that is monitored by the parking meter if the license plate recognition procedure fails to generate the result; and manually inputting to the parking management computer system a license plate data for the license plate shown in the image, wherein the manually entered license plate data is used by the parking management computer system to perform the step of determining whether the result of the license plate recognition procedure matches the license plate data inputted by the user.

12. The method of claim 10, wherein the parking meter is configured as a bollard.

13. A method of protecting subscribers of a parking subscription service from a ticket issued by a parking enforcement officer (PEO), wherein a smart parking meter generates a violation notification for a vehicle registered in a parking subscription service due to a smart parking system being unable to perform a license plate recognition on an image of a license plate of the vehicle created by a camera coupled to a parking meter monitoring a parking space where the vehicle is parked, the method comprising:

manually inputting to a parking management computer system a license plate data for the license plate shown in the image after the violation notification has been generated;

determining by the parking management computer system that the license plate data that was manually inputted matches an active subscription parker's roster of registered vehicles;

directing funds from the subscription parker's account to the parking meter so the parking meter shows paid time; and clearing a violation indication at the parking meter.

14. The method of claim 13, further comprising informing a violations generating app on a computing device of the PEO, which is networked with the parking management computer system, that a violation notice cannot be issued because the vehicle belongs to the active subscription parker's roster of registered vehicles.

\* \* \* \* \*